United States Patent
Disch et al.

(10) Patent No.: US 12,048,406 B2
(45) Date of Patent: Jul. 30, 2024

(54) SYSTEM FOR LOADING A DISHWASHER AND DISHWASHER HAVING A SYSTEM OF THIS KIND

(71) Applicant: ILLINOIS TOOL WORKS INC., Glenview, IL (US)

(72) Inventors: Harald Disch, Elzach (DE); Martin Schrempp, Biberach (DE); Adrian Boldt, Offenburg-Bühl (DE); Jürgen Schemel, Achern (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 331 days.

(21) Appl. No.: 17/426,937

(22) PCT Filed: Jan. 30, 2020

(86) PCT No.: PCT/US2020/015769
§ 371 (c)(1),
(2) Date: Jul. 29, 2021

(87) PCT Pub. No.: WO2020/163140
PCT Pub. Date: Aug. 13, 2020

(65) Prior Publication Data
US 2022/0095880 A1 Mar. 31, 2022

(30) Foreign Application Priority Data
Feb. 5, 2019 (DE) .................... 10 2019 102 800.0

(51) Int. Cl.
*A47L 15/24* (2006.01)
*A47L 15/42* (2006.01)
(Continued)

(52) U.S. Cl.
CPC ........... *A47L 15/245* (2013.01); *A47L 15/248* (2013.01); *A47L 15/4295* (2013.01);
(Continued)

(58) Field of Classification Search
CPC .. A47L 15/4295; A47L 15/248; A47L 15/245; A47L 15/241; A47L 2501/36;
(Continued)

(56) References Cited

U.S. PATENT DOCUMENTS 3,442,368 A * 5/1969 Heifetz ................ B65G 17/385
198/733
3,520,726 A 7/1970 Gay
(Continued)

FOREIGN PATENT DOCUMENTS

CN 104207745 A 12/2014
CN 105231971 A 1/2016
(Continued)

OTHER PUBLICATIONS

PCT, International Search Report and Written Opinion, International Application No. PCT/US2020/015769; date of mailing May 4, 2020, 14 pages.

*Primary Examiner* — Benjamin L Osterhout
(74) *Attorney, Agent, or Firm* — THOMPSON HINE LLP

(57) ABSTRACT

A system (10) for loading a dishwasher which is designed as, in particular, a commercial conveyor dishwasher (1). The system (10) has a feed conveyor belt (11) for feeding washware (9a, 9b, 9c) to a loading region of the conveyor dishwasher (1). The system (10) also has a sorting arrangement for sorting the washware (9a, 9b, 9c), which is fed to the loading region of the conveyor dishwasher (1) by means of the feed conveyor belt (11), in accordance with predefined or predefinable washware groups. At least one loading arrangement (13a, 13b, 13c) is associated with the sorting arrangement for the purpose of automatically loading the conveyor dishwasher (1) with washware (9a, 9b, 9c) of one of the predefined or predefinable washware groups.

12 Claims, 5 Drawing Sheets

(51) Int. Cl.
*B25J 9/00* (2006.01)
*B25J 13/08* (2006.01)
B25J 15/00 (2006.01)
B25J 15/06 (2006.01)
B25J 15/08 (2006.01)
B25J 19/02 (2006.01)

(52) U.S. Cl.
CPC ............. *B25J 9/0093* (2013.01); *B25J 13/08* (2013.01); *A47L 15/241* (2013.01); *A47L 15/247* (2013.01); *A47L 2401/04* (2013.01); *A47L 2501/36* (2013.01); *B25J 15/0028* (2013.01); *B25J 15/0608* (2013.01); *B25J 15/0616* (2013.01); *B25J 15/08* (2013.01); *B25J 19/023* (2013.01)

(58) Field of Classification Search
CPC .. A47L 15/247; A47L 2401/04; B25J 19/023; B25J 9/0093; B25J 15/08; B25J 13/08; B25J 15/0616; B25J 15/0028; B25J 15/0608
See application file for complete search history.

(56) References Cited

U.S. PATENT DOCUMENTS

| | | | | |
|---|---|---|---|---|
| 3,670,911 A | * | 6/1972 | Ettlinger, Jr. | ............ A47L 21/02 414/419 |
| 3,682,184 A | * | 8/1972 | Jackson | .................. A47L 15/00 134/132 |
| 3,773,058 A | * | 11/1973 | Kitterman | ........... A47L 15/0092 134/115 R |
| 3,822,729 A | * | 7/1974 | Rochette | ................ A47B 69/00 134/115 R |
| 3,938,533 A | * | 2/1976 | Richard | .................. B07C 99/00 209/907 |
| 10,647,524 B1 | * | 5/2020 | Ma | ........................ B65G 47/904 |
| 10,647,525 B1 | * | 5/2020 | Ma | ........................ B65G 47/92 |
| 2007/0295362 A1 | | 12/2007 | Doherty et al. | |
| 2010/0043834 A1 | | 2/2010 | Scheringer | |
| 2012/0180820 A1 | * | 7/2012 | Hong | .................... A47L 15/248 134/25.2 |
| 2013/0319828 A1 | | 12/2013 | Disch | |
| 2018/0036889 A1 | | 2/2018 | Birkmeyer | |
| 2018/0072523 A1 | * | 3/2018 | Peters | ................. B25J 15/0052 |
| 2020/0163522 A1 | * | 5/2020 | Peters | ................. B65G 47/848 |
| 2020/0165079 A1 | * | 5/2020 | Birkmeyer | ............... B25J 15/06 |

FOREIGN PATENT DOCUMENTS

| | | | | |
|---|---|---|---|---|
| CN | 106963318 A | 7/2017 | | |
| CN | 107397519 A | 11/2017 | | |
| CN | 108784591 A | 11/2018 | | |
| DE | 1956049 A | 5/1971 | | |
| DE | 102011004853 A1 | 8/2012 | | |
| EP | 2158833 A2 | 3/2010 | | |
| EP | 2720597 B1 | 4/2014 | | |
| WO | WO-2012078400 A2 | * | 6/2012 | ............ A47L 15/24 |
| WO | WO 2012173479 A1 | 12/2012 | | |

* cited by examiner

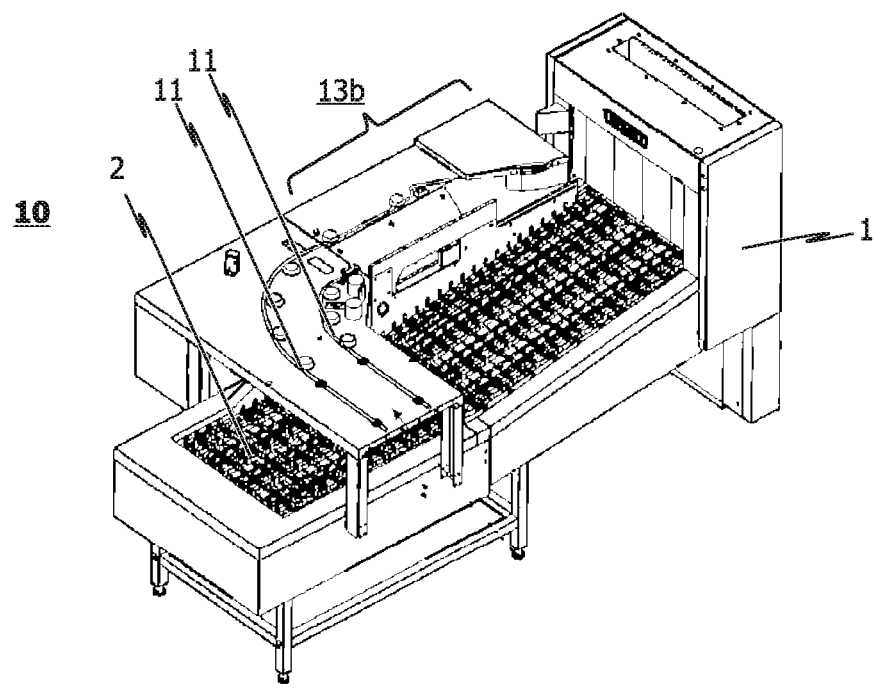
FIG. 4
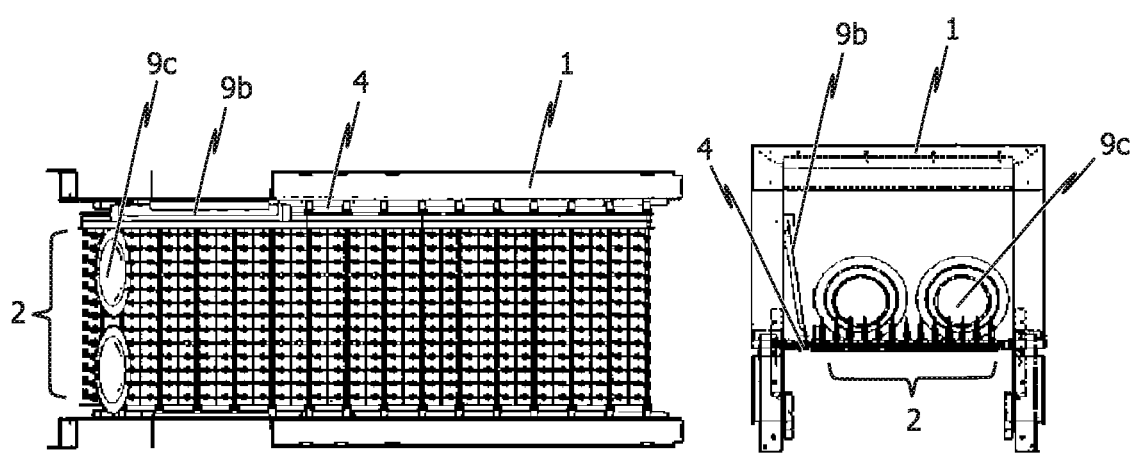
FIG. 5A
FIG. 5B

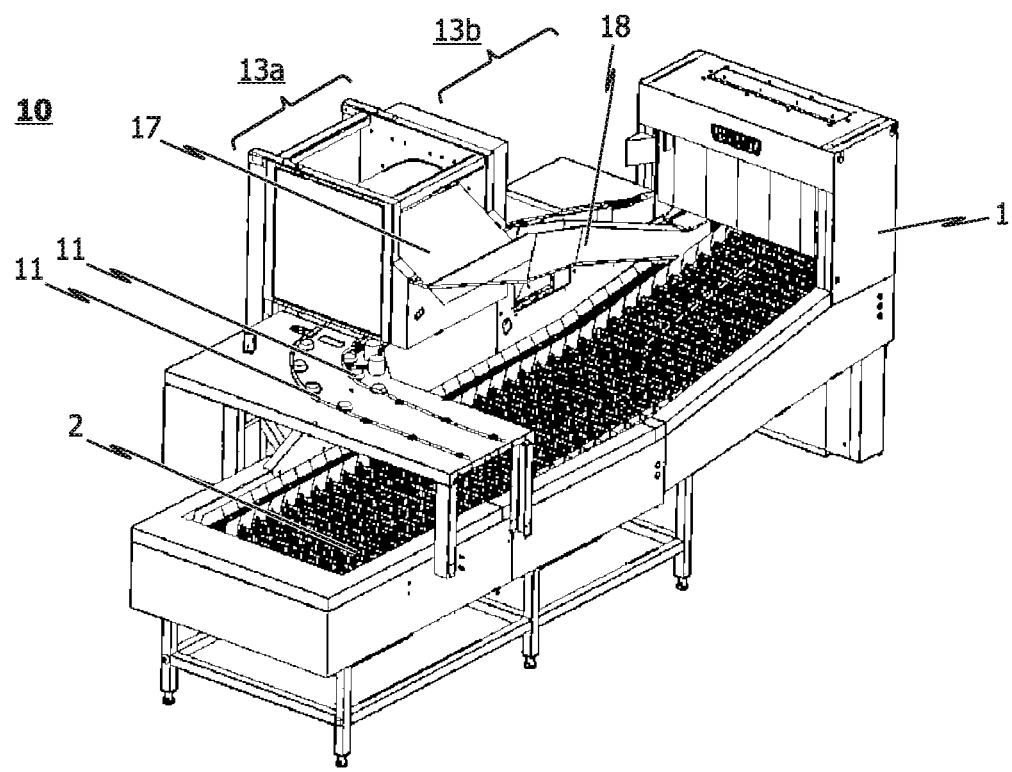
FIG. 6
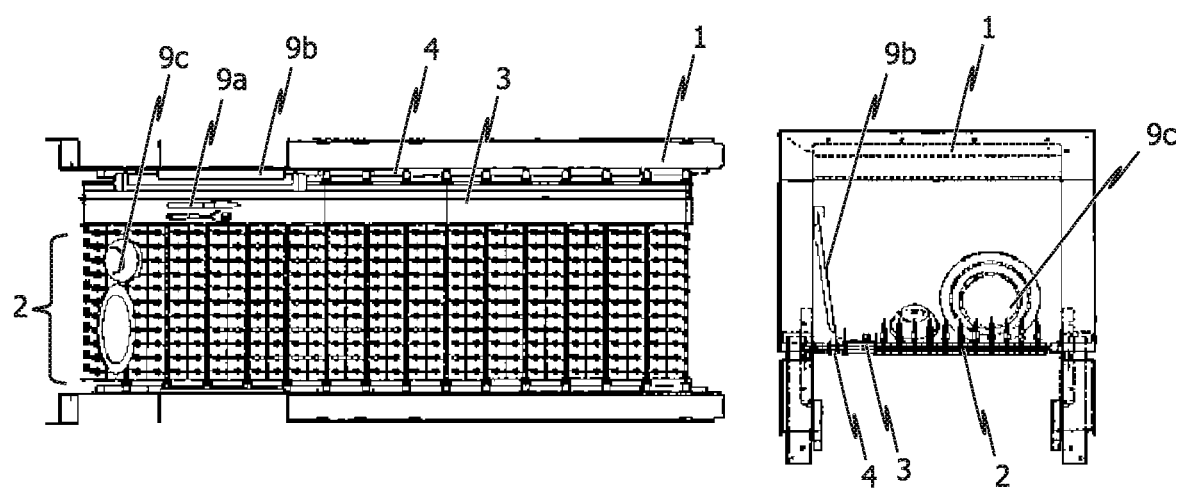
FIG. 7A
FIG. 7B

SYSTEM FOR LOADING A DISHWASHER AND DISHWASHER HAVING A SYSTEM OF THIS KIND

TECHNICAL FIELD

The present invention relates to a conveyor dishwasher and to a system for loading a conveyor dishwasher.

The conveyor dishwasher according to the invention is in particular a commercial conveyor dishwasher and can be designed as a flight-type dishwasher or as a rack-conveyor dishwasher.

BACKGROUND

Conveyor dishwashers are used in the commercial sector. In contrast to domestic dishwashers, in which the washware to be cleaned remains fixed in position in the washer during cleaning, the washware in conveyor dishwashers is conveyed through different treatment zones of the washer.

In conveyor dishwashers, the washware, for example trays, dishes, pots, glasses, cutlery and other utensils to be cleaned, is conveyed through a plurality of treatment zones, for example prewash zone(s), main wash zone(s), post-wash or pre-rinse zone(s), final rinse zone(s), and drying zone(s). For conveying washware through the conveyor dishwasher in a conveying direction, use is made of a conveyor apparatus, which generally has compartments for holding washware. In a flight-type dishwasher, the compartments can be formed by supporting fingers on a conveyor belt of the conveyor apparatus. In rack-conveyor dishwashers, dish racks, in which compartments can be formed for receiving the washware to be treated, serve as the conveyor apparatus. It is conceivable here for the dish racks to be conveyed through the rack-conveyor dishwasher by a conveying device.

The washware to be cleaned is usually pre-sorted before being placed on the conveyor belt. For example, the document U.S. Pat. No. 6,530,996 B2 discloses a rack-conveyor dishwasher in which the washware to be treated is pre-sorted and delivered in dish racks to the respective treatment zones.

Conveyor dishwashers are used in particular in large facilities such as eateries and canteens in order to clean large quantities of dirtied washware as economically as possible. With conveyor dishwashers of the kind known at present, several hundred place settings per hour can be cleaned. Tests have shown that, on average, each place setting generally consists of a tray, a plate, one or two bowls, a drinking glass and cutlery.

In almost all large kitchens, for example company canteens or eateries, the washware (crockery, drinking glasses, cutlery, etc.) that has been used by the diners is returned on trays. From the return station, the place settings are transported to the wash kitchen. The place settings are usually conveyed on a corresponding feed conveyor belt. The place setting is fed on a conveyor belt from the return station to the wash kitchen, directly to a loading region of the conveyor dishwasher.

In the loading or inlet region of the conveyor dishwasher, the items of washware are then usually picked up manually by the operating personnel and placed onto the conveyor belt of the conveyor dishwasher.

As regards trays or tray-like articles, the pre-sorting is usually such that the items of crockery and cutlery are picked up manually by the operating personnel from a tray that is to be cleaned, and the tray is then placed on a stack in front of the conveyor apparatus or in the inlet region (dirty side) of the conveyor dishwasher. The trays from this stack of trays are from time to time placed, in a manner sorted by type, onto the conveyor belt of the conveyor dishwasher and cleaned.

This process of sorting by type has the advantage that trays cannot cast spray shadows over smaller items of washware which have been stacked behind the trays. Furthermore, this procedure greatly simplifies the sequence of work for stacking and destacking and makes it more efficient in comparison to mixing the washware with the trays that are to be cleaned.

However, while the trays from this stack of trays are placed, in a manner sorted by type, onto the conveyor belt of the dishwasher and cleaned, it is not possible to clean other washware, for example plates, bowls or other crockery, since the trays which are to be placed on the conveyor belt usually have to be placed in the conveyor belt transverse to the conveying direction and therefore take up all of the available surface area of the conveyor belt. Therefore, a relatively large amount of time has to be spent cleaning trays in comparison to other types of washware.

Furthermore, the operating personnel of the conveyor dishwasher at the machine inlet have to include each tray twice in their sequence of work: the first time when removing the items of cutlery and crockery from the tray to be cleaned and the second time when actually placing the trays on the conveyor belt of the conveyor dishwasher.

In the operating process described, the amount of manual work involved is particularly high. Each item of washware (item of crockery) of each place setting has to be picked up individually and manually from the tray and placed onto the conveyor belt of the dishwasher.

Moreover, the individual items of cutlery of each place setting have to be removed manually from the tray and likewise fed to the conveyor dishwasher.

The above-described treatment of the actual trays then takes place.

With a machine capacity of several thousand plates per hour, the work has to be carried out particularly quickly and efficiently, as a result of which the physical strain on the operating personnel increases.

SUMMARY

In light of this problem, the object of the present invention is to specify a solution for a conveyor dishwasher of the type cited in the introductory part in such a way that it enables the entire washing and rinsing process to be made more efficient, as a result of which, in particular, the working time of the dishwashing personnel can be shortened and the consumption of resources by the dishwasher can be reduced.

According to the invention, this object is achieved by the subject matter of independent claim 1, with advantageous developments of said subject matter being set forth in the corresponding dependent claims.

Accordingly, the invention relates in particular to a system for preferably automatic or at least partially automatic loading of a dishwasher which is designed in particular as a commercial conveyor dishwasher, wherein the system has a feed conveyor belt for feeding washware to a loading region of the conveyor dishwasher, and a sorting arrangement for preferably automatic or at least partially automatic sorting of the washware, which is fed to the loading region of the conveyor dishwasher by means of the feed conveyor belt, specifically in accordance with predefined or predefinable washware groups.

The sorting arrangement can be designed for example to sort the washware, which is fed by means of the feed conveyor belt, in accordance with at least the following washware groups:

- a first washware group which comprises cutlery and/or items of cutlery which is/are produced from a metal, in particular stainless steel;
- a second washware group which comprises trays and tray-like objects which are produced from a plastic material; and
- a third washware group which comprises items of crockery, in particular plates, cups and/or bowls, which are produced from porcelain or a porcelain-like material.

In addition to this, it is optionally conceivable that the sorting arrangement is designed to also sort the washware, which is fed by means of the feed conveyor belt, in accordance with at least one of the following washware groups:

- a fourth washware group which comprises drinking glasses and/or bowls which are produced from glass or from a glass-like material; and
- a fifth washware group which comprises containers, in particular GN containers, pots and/or pans, which are produced from a metal, in particular stainless steel.

According to the invention, provision is made in particular that at least one loading arrangement is associated with the sorting arrangement of the loading system for the purpose of automatically loading the conveyor dishwasher with washware of one of the predefined or predefinable washware groups, for example with washware according to the first, second or third washware group.

With the loading system according to the invention, the conveyor dishwasher can be configured with different expansion levels for the automation of manual loading and unloading work steps. A first expansion level can entail that the conveyor dishwasher has, in addition to the main conveyor belt, also a tray lane (tray-conveying belt), wherein this tray lane is preferably arranged parallel to the main conveyor belt.

At this expansion level, the place settings as already described, for example, are placed onto the feed conveyor belt of the loading system either directly by the diners or by the dishwashing personnel. The feed conveyor belt then conveys the place settings to the inlet or loading region of the conveyor dishwasher. There, the items of cutlery and crockery are removed manually from the trays. The manually removed items of crockery are then placed manually, according to type, into the main conveyor belt of the conveyor dishwasher. The removed items of cutlery can be collected in wash baskets and cleaned subsequently in the conveyor dishwasher.

With the first expansion level, the trays are no longer placed manually into the dishwasher according to type. They are conveyed onward in parallel by the feed conveyor belt in the direction of the machine intake of the conveyor dishwasher and are there introduced automatically into a special tray-conveying belt (tray lane) by a synchronizing device or setting device. This tray lane preferably runs parallel to the main conveyor belt.

According to a second expansion level, a separate cutlery lane can be present in addition to the aforementioned tray lane. This cutlery lane preferably likewise runs parallel to and directly adjacent to the tray lane.

As has been described above, the place settings are conveyed by the feed conveyor belt of the loading system to the inlet or loading region of the conveyor dishwasher. In this second expansion level, it is now only necessary to manually remove the items of crockery and the glasses from the delivered trays and place them according to type in the main conveyor belt. The tray and the cutlery situated thereon remain on the feed conveyor belt. The latter is conveyed onward to a synchronizing device for cutlery, for example a cutlery pickup magnet. Here, the items of cutlery can be removed automatically from the trays and introduced into the cutlery lane of the conveyor dishwasher. The tray is then conveyed to the synchronizing device, where it is loaded automatically into the tray lane of the conveyor dishwasher.

In addition to this, in order to further reduce the manual handling steps needed for loading the conveyor dishwasher, the loading system according to the invention is such that plates and bowls can also be automatically introduced according to type into the conveyor dishwasher and in particular into a main conveyor belt of the conveyor dishwasher.

In this way, it is possible overall to thus reduce the number of manual work steps and thereby facilitate the work of the dishwashing personnel since, ideally, the dishwashing personnel no longer have to manually load the conveyor dishwasher. In particular, the loading system according to the invention ensures highly ergonomic and userfriendly operation of the conveyor dishwasher, since manual loading of the washware items into the conveyor dishwasher is no longer necessary.

In addition to this, the cleaning results provided by the dishwasher are improved with the loading system according to the invention, since all the washware of a defined washware group is oriented uniformly on the main conveyor of the conveyor dishwasher. Furthermore, the unloading process can be simplified, since each washware group can be transported through the conveyor dishwasher on a defined lane and is therefore already pre-sorted when it arrives at the unloading region of the conveyor dishwasher.

To ensure that the washware delivered to the loading region of the conveyor dishwasher by the feed conveyor belt of the loading system according to the invention can be sorted in accordance with the predefined or predefinable washware groups, provision is made, according to embodiments of the loading system according to the invention, that the sorting arrangement is designed to sort the items of washware, which are fed by means of the feed conveyor belt, in accordance with the predefined or predefinable washware groups depending on the material, size and/or shape of said items of washware.

For example, it is conceivable for the sorting arrangement to be designed such that washware to be treated in the conveyor dishwasher is automatically differentiated. For this purpose, the sorting arrangement can be assigned a washware detector device, which serves to detect the type of washware item (plates, cups, bowls, cutlery, trays, drinking glasses, etc.) delivered by the feed conveyor belt, and then to assign each detected type of washware to a predefined or predefinable washware group.

For this purpose, the sorting arrangement can be assigned a corresponding washware detector device, which serves to detect the type of the washware items delivered by the feed conveyor belt.

The term "washware detector device" used here is to be understood as any detection device that is designed to detect or determine the type of washware delivered by the feed conveyor belt. It is conceivable in particular here that the washware detector device has at least one detector means with which the size, shape and/or material of the washware items delivered by the feed conveyor belt can be detected.

According to possible embodiments, the washware detector device can have at least one preferably optical, inductive or capacitive detector means, such that the size, shape and/or material of the corresponding washware item can be detected in order to identify the type of washware. However, other types of detector can also be used as the detector means, for example inductive proximity sensors, light scanners, light curtains, laser scanners, 3D lasers, cameras, rotary encoders, etc.

The washware detector device is preferably arranged upstream from the sorting arrangement and in particular upstream from the at least one loading arrangement assigned to the sorting arrangement, so that the type of washware delivered can be detected and the corresponding loading arrangement can be activated.

According to embodiments, the sorting arrangement of the loading system according to the invention, or the washware detector device assigned to the sorting arrangement, is designed to automatically detect at least the following washware:

plates which are manufactured from porcelain or a porcelain-like material;
cups which are manufactured from porcelain or a porcelain-like material, glass or a glass-like material;
bowls which are manufactured from porcelain or a porcelain-like material, glass or a glass-like material;
trays or tray-like articles which are manufactured from a plastic material;
containers, in particular GN containers, which are manufactured from a metal, in particular from stainless steel;
pots which are manufactured from a metal, in particular from stainless steel;
pans which are manufactured from a metal, in particular from stainless steel;
cutlery and items of cutlery which is/are manufactured from a metal, in particular from stainless steel;
drinking glasses which are manufactured from glass or a glass-like material; and
drinking beakers which are produced from plastic.

According to embodiments of the loading system according to the invention, the sorting arrangement is not only designed to automatically detect the type of the washware items delivered by the feed conveyor belt but also, by virtue of its additional functionality, to assign each detected type of washware to a predefined or predefinable washware group.

For example, the sorting arrangement is designed to sort the washware, which is fed by means of the feed conveyor belt, in accordance with at least the following washware groups:

a first washware group comprising cutlery and/or items of cutlery which is/are produced from a metal, in particular stainless steel;
a second washware group comprising trays and tray-like objects which are produced from a plastic material; and
a third washware group comprising items of crockery, in particular plates, cups and/or bowls, which are produced from porcelain or a porcelain-like material.

This allocation takes account of the recognition that washware of different washware types which can be introduced in a manner sorted by type into identical transport lanes at the feed or loading region of the conveyor dishwasher are combined in one washware group.

It is in particular advantageous if the sorting arrangement has a plurality or large number of sorting stations, in which the washware which is fed by means of the feed conveyor belt is sorted successively into the predefined washware groups. These sorting stations are preferably arranged one behind the other, as seen in the conveying direction of the feed conveyor belt.

To ensure that the automatic loading system can operate fully automatically, at least one loading arrangement per washware group is assigned to the sorting arrangement or to each of the individual sorting stations of the sorting arrangement.

In the abovementioned example, in which the sorting arrangement is designed to sort the washware delivered by the feed conveyor belt in accordance with said three washware groups, a first loading arrangement is preferably associated with the sorting arrangement for the purpose of automatically loading the conveyor dishwasher with washware of the first washware group, wherein furthermore a second loading arrangement is preferably associated with the sorting arrangement for the purpose of automatically loading the conveyor dishwasher with washware of the second washware group, and wherein furthermore a third loading arrangement is associated with the sorting arrangement for the purpose of automatically loading the conveyor dishwasher with washware of the third washware group.

To be compatible with the above-described two expansion levels for automation of manual loading and unloading steps, the third loading arrangement is preferably arranged upstream, as seen in the conveying direction of the feed conveyor belt, from the first and second loading arrangement, wherein the first loading arrangement is preferably arranged upstream from the second loading arrangement.

According to preferred configurations of the loading system according to the invention, the third loading arrangement, designed to automatically load the conveyor dishwasher with washware of the third washware group, has at least one manipulator which is designed to grip the items of washware of the third washware group which are fed by means of the feed conveyor belt, to remove said items of washware from the feed conveyor belt and to set down said items of washware at a predefined or predefinable dedicated position.

This predefined or predefinable dedicated position is, for example, a region of a conveyor belt, in particular the main conveyor belt, of the conveyor dishwasher. Alternatively to this, however, it is also conceivable if the predefined or predefinable dedicated position lies in a region which is preferably located outside the conveyor dishwasher and serves as a set-down area for forming a stack of washware, in particular a stack of crockery.

According to preferred configurations of the loading system according to the invention, the at least one manipulator of the third loading arrangement has a gripper system having at least one set of gripping tongs and/or having at least one suction gripper. The manipulator of the third loading arrangement is here designed to grip the items of washware of the third washware group delivered by the feed conveyor belt, to remove said items of washware from the feed conveyor belt and to set down said items of washware at said predefined or predefinable dedicated position, wherein this is either a region of a conveyor belt, in particular a main conveyor belt, of the conveyor dishwasher or a set-down area outside the conveyor dishwasher. Optionally or additionally to this, the at least one manipulator of the third loading arrangement can have an actuable magnet for cutlery or items of cutlery, so as to be able to dispense with a separate cutlery pick-up magnet.

In this connection, it is conceivable that the at least one manipulator of the third loading arrangement has a starting position in which the gripper system of the manipulator is arranged above the feed conveyor belt in such a way that items of washware of the third washware group, when they are conveyed by the feed conveyor belt, are conveyed into the gripping region of the at least one set of gripping tongs and/or into the gripping region of the at least one suction gripper. The starting position of the at least one manipulator of the third loading arrangement is preferably selected in such a way that, when conveyed by the feed conveyor belt, only items of washware of the third washware group, but not items of washware of the first or second washware group, are conveyed into the gripping region of the at least one set of gripping tongs and/or of the at least one suction gripper. This can be achieved, for example, if the gripper system is suitably spaced apart vertically from the plane in which the feed conveyor belt lies.

It is advantageous in principle if a suitable sensor system is associated with the gripper system of the at least one manipulator of the third loading arrangement, which sensor system is designed to detect when at least one item of washware, and in particular at least one item of washware of the third washware group, is located in the gripping region of the at least one set of gripping tongs and/or in the gripping region of the at least one suction gripper. It is also conceivable in this connection that a suitable control device is provided, which control device is designed to initiate gripping by the at least one set of gripping tongs and/or the at least one suction gripper when the sensor system, which is associated with the gripper system, detects that at least one item of washware, and in particular at least one item of washware of the third washware group, is located in the gripping region of the at least one set of gripping tongs and/or in the gripping region of the at least one suction gripper.

In this connection, it is expedient if the control device is also designed to actuate the at least one manipulator of the third loading arrangement in such a way that said manipulator removes the at least one item of washware, which is gripped by the gripper system, from the feed conveyor belt and sets down said item of washware at a predefined or predefinable dedicated position, for example on the main conveyor belt of the conveyor dishwasher.

In a development of the last-mentioned embodiments, a positioning aid is associated with the gripper system of the at least one manipulator of the third loading arrangement, which positioning aid has at least one guide element, wherein the at least one guide element is designed to direct preferably only washware of the third washware group, which is fed by means of the feed conveyor belt, in the direction of the gripping region of the at least one set of gripping tongs and/or in the direction of the gripping region of the at least one suction gripper.

Alternatively or additionally to this, a preferably optically operating identification system can be associated with the gripper system for the purpose of automatically identifying washware which is fed by means of the feed conveyor belt, in particular washware of the third washware group. In this embodiment, it is expedient if a control device is provided, which control device is designed to move the manipulator of the third loading arrangement with the gripper system to the item of washware when the identification system identifies an item of washware of the third washware group in the washware which is fed by means of the feed conveyor.

The invention relates not only to a loading system for preferably fully automatic loading of a conveyor dishwasher, but also to a corresponding conveyor dishwasher having a loading system of this kind.

BRIEF DESCRIPTION OF THE DRAWINGS

Illustrative embodiments of the solution according to the invention are described in more detail below with reference to the drawings, in which:

FIG. 4 shows schematically, and in an isometric view, the loading region of a conveyor dishwasher with an illustrative embodiment of the loading system according to the invention, in which a corresponding loading arrangement is used for automatic loading of a tray lane extending parallel to a main conveyor belt of the conveyor dishwasher;

FIGS. 5A and 5B show schematically, and in a plan view and cross-sectional view, the main conveyor belt and the tray lane, extending parallel thereto, of the conveyor dishwasher according to FIG. 4;

FIG. 6 shows schematically, and in an isometric view, the loading region of a conveyor dishwasher with an illustrative embodiment of the loading system according to the invention, in which a corresponding loading arrangement is used for automatic loading of a tray lane extending parallel to a main conveyor belt of the conveyor dishwasher and also for automatic loading of a cutlery lane extending parallel to the main conveyor belt; and FIGS. 7A and 7B show schematically, and in a plan view and cross-sectional view, the main conveyor belt and, extending parallel thereto, the tray and cutlery lanes of the conveyor dishwasher according to FIG. 6.

DETAILED DESCRIPTION

Figure 1:
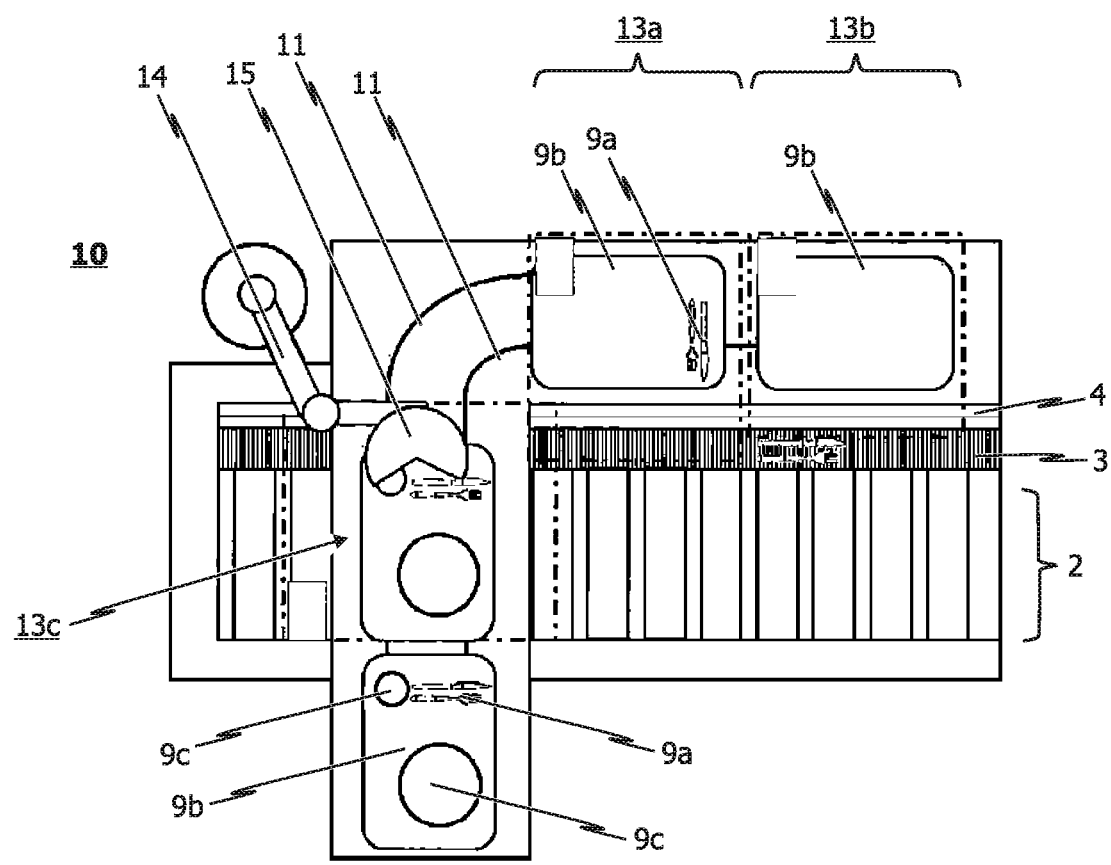
FIG. 1 shows schematically, and in a plan view, the loading region of a conveyor dishwasher, with an illustrative embodiment of the loading system according to the invention.

FIG. 1 shows schematically, and in a plan view, the loading region of a conveyor dishwasher 1, of which only some parts are shown. The conveyor dishwasher 1 has a conveyor apparatus (main conveyor belt 2, cutlery conveyor belt 3, tray conveyor belt 4) for transporting washware 9a, 9b, 9c in a conveying direction through the conveyor dishwasher 1. The conveyor apparatus is in particular configured to allow several washware types arranged next to each other to be treated simultaneously in the treatment zones of the conveyor dishwasher 1, in order thereby to make the entire washing and rinsing process more efficient, as a result of which in particular the work time of the dishwashing personnel and the consumption of resources by the dishwasher 1 can be reduced.

The conveyor dishwasher 1 in question here has at least one wash zone, for example a pre-wash zone and a main wash zone which, seen in the conveying direction of the washware 9a, 9b, 9c, is arranged downstream from the pre-wash zone. Seen in the conveying direction, a post-wash zone is preferably arranged downstream from the at least one wash zone, and at least one final-rinse zone is arranged downstream from the post-wash zone, for example a fresh-water final-rinse zone and/or a pump final-rinse zone. Seen in the conveying direction of the washware 9a, 9b, 9c, the at least one final-rinse zone is followed by a drying zone.

The respective zones of the conveyor dishwasher 1 can be separated from one another via separating curtains. It is also conceivable for the inflow tunnel of the conveyor dishwasher 1, which is provided after the loading region of the conveyor dishwasher 1 as seen in the conveying direction, to be separated from the inlet of the conveyor dishwasher 1 via a separating curtain. As a result of the provision of separating curtains, overspraying of washing liquid and final-rinse liquid and the escape of vapors from the conveyor dishwasher 1 can be prevented.

Spray nozzles are assigned to the treatment zones of the conveyor dishwasher 1. These spray nozzles serve to spray liquid onto the washware 9a, 9b, 9c to be treated, when the latter is conveyed through the respective treatment zones by the conveyor apparatus. The individual spray systems of the treatment zone ensure that the washware 9a, 9b, 9c to be treated is spray-washed from the top side and also from the underside.

In the embodiment shown schematically in FIG. 1, a system 10 for loading the conveyor dishwasher 1 is provided at the loading region of the conveyor dishwasher 1. The loading system 10 has an associated feed conveyor belt 11 via which washware 9a, 9b, 9c can be fed to the loading region of the conveyor dishwasher 1.

The loading system 10 moreover has a sorting arrangement by which the washware 9a, 9b, 9c delivered by the feed conveyor belt 11 to the loading region of the conveyor dishwasher 1 is sorted in accordance with predefined or predefinable washware groups.

In the illustrative embodiment shown in FIG. 1, the sorting arrangement is specifically designed to sort the washware 9a, 9b, 9c, which is fed by means of the feed conveyor belt 11, in accordance with the following washware groups:
- a first washware group which comprises cutlery and/or items of cutlery 9a which is/are produced from a metal, in particular stainless steel;
- a second washware group which comprises trays and tray-like objects 9b which are produced from a plastic material; and
- a third washware group which comprises items of crockery 9c, in particular plates, cups and/or bowls, which are produced from porcelain or a porcelain-like material.

It is conceivable in principle that the sorting arrangement is moreover designed to sort the washware 9a, 9b, 9c, which is fed by means of the feed conveyor belt 11, additionally in accordance with at least one of the following washware groups:
- a fourth washware group which comprises drinking glasses and/or bowls which are produced from glass or from a glass-like material; and
- a fifth washware group which comprises containers, in particular GN containers, pots and/or pans, which are produced from a metal, in particular stainless steel.

The loading system 10 according to the invention, of which an illustrative embodiment is shown schematically in a plan view in FIG. 1, has moreover at least one loading arrangement 13a, 13b, 13c assigned to the sorting arrangement in order to automatically load the conveyor dishwasher 1, and specifically appropriate lanes or regions of the conveyor belt (e.g. main conveyor belt 2, cutlery conveyor belt 3, tray conveyor belt 4) of the conveyor dishwasher 1, with washware 9a, 9b, 9c of one of the predefined or predefinable washware groups.

For example, in the solution shown schematically in FIG. 1, a first loading arrangement 13a is provided, which is designed to automatically load the conveyor dishwasher 1, and specifically a cutlery lane 3 running parallel to a main conveyor belt 2 of the conveyor dishwasher 1, with washware 9a of the first washware group (i.e. with cutlery and/or items of cutlery which are produced from metal, in particular stainless steel).

Moreover, a second loading arrangement 13b is used, which is designed to automatically load the conveyor dishwasher 1, and specifically a tray lane 4 running parallel to the main conveyor belt 2 of the conveyor dishwasher 1, with washware 9b of the second washware group (i.e. with trays and tray-like objects produced from a plastic material).

In addition, in the illustrative embodiment shown in FIG. 1, a third loading arrangement 13c is used, which is designed to automatically load the conveyor dishwasher 1, and specifically the main conveyor belt 2 of the conveyor dishwasher 1, with washware 9c of the third washware group (i.e. with items of crockery which are produced from porcelain or a porcelain-like material).

For example, provision is made here that the third loading arrangement 13c is arranged upstream from the first and second loading arrangement 13a, 13b, as seen in the conveying direction of the feed conveyor belt. Furthermore, in the embodiment shown in FIG. 1, provision is made that the first loading arrangement 13a is arranged upstream from the second loading arrangement 13b.

In the illustrative embodiment shown in FIG. 1, the third loading arrangement 13c has a manipulator 14 which is designed in particular to grip items of washware 9c of the third washware group, remove them from the feed conveyor belt 11 and set them down at a predefined or predefinable dedicated position.

This predefined or predefinable dedicated position is a position in a region of the conveyor belt of the conveyor dishwasher 1, in particular in a region of a main conveyor belt 2 of the conveyor dishwasher 1.

Alternatively to this, however, it is also conceivable in principle if the predefined or predefinable dedicated position lies in a region which is preferably located outside the conveyor dishwasher 1 and serves as a set-down area for forming a stack of crockery.

As can be seen from the plan view in FIG. 1, provision is made in the illustrative embodiment of the loading system 10 according to the invention that the at least one manipulator 14 of the third loading arrangement 13c has a gripper system 15 having at least one set of gripping tongs.

Alternatively or additionally to a set of gripping tongs, it would however also be conceivable if the gripper system 15 of the third loading arrangement 13c has at least one suction gripper.

It is advantageous in principle if the manipulator 14 of the third loading arrangement 13c is designed to grip, with the gripper system 15, in particular washware 9c of the third washware group, to remove said washware from the feed conveyor belt 11 and to set down said washware at the predefined or predefinable dedicated position.

In this connection, it is conceivable that the at least one manipulator 14 of the third loading arrangement 13c has a starting position or standby position in which the gripper system 15 of the manipulator 14 is arranged above the feed conveyor belt 11 in such a way that items of washware 9c of the third washware group, when they are conveyed by the feed conveyor belt 11, are conveyed into the gripping region of the at least one set of gripping tongs.

Figure 2A:
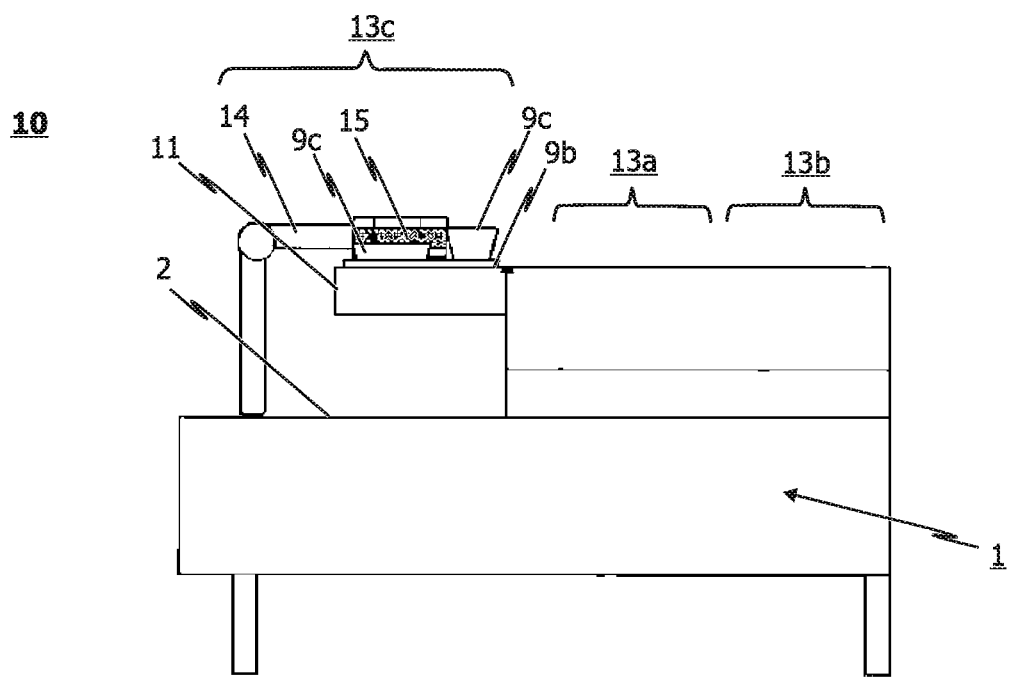
FIG. 2A shows schematically, and in a side view, an illustrative embodiment of the loading system according to the invention in a first state, in which a manipulator of the loading system is located in its starting position or standby position.

In this connection, reference is made to the schematic illustration in FIG. 2A. Specifically FIG. 2A shows schematically, and in a side view, an illustrative embodiment of the loading system 10 according to the invention in a first state, in which a manipulator 14 of the loading system 10 is in its starting position or standby position.

The starting position or standby position of the at least one manipulator 14 of the third loading arrangement 13c is in particular selected in such a way that, when conveyed by the feed conveyor belt 11, only items of washware 9c of the third washware group, but not items of washware 9a, 9b of the first or second washware group, are conveyed into the gripping region of the at least one set of gripping tongs.

Advantageously, a sensor system is associated with the gripper system 15 of the at least one manipulator 14 of the third loading arrangement 13c, which sensor system is designed to detect when at least one item of washware 9a, 9b, 9c, and in particular at least one item of washware 9c of the third washware group, is located in the gripping region of the at least one set of gripping tongs.

The loading system 10 is preferably assigned a control device which is designed to initiate gripping by the at least one set of gripping tongs when the sensor system, assigned to the gripper system 15, detects that at least one item of washware 9a, 9b, 9c, and in particular at least one item of washware 9c of the third washware group, is located in the gripping region of the at least one set of gripping tongs.

According to advantageous embodiments, the control device is also preferably designed to actuate the at least one manipulator 14 of the third loading arrangement 13c in such a way that said manipulator removes the at least one item of washware, which is gripped by the gripper system 15, from the feed conveyor belt 11 and sets down said item of washware at a predefined or predefinable dedicated position.

Figure 2B:
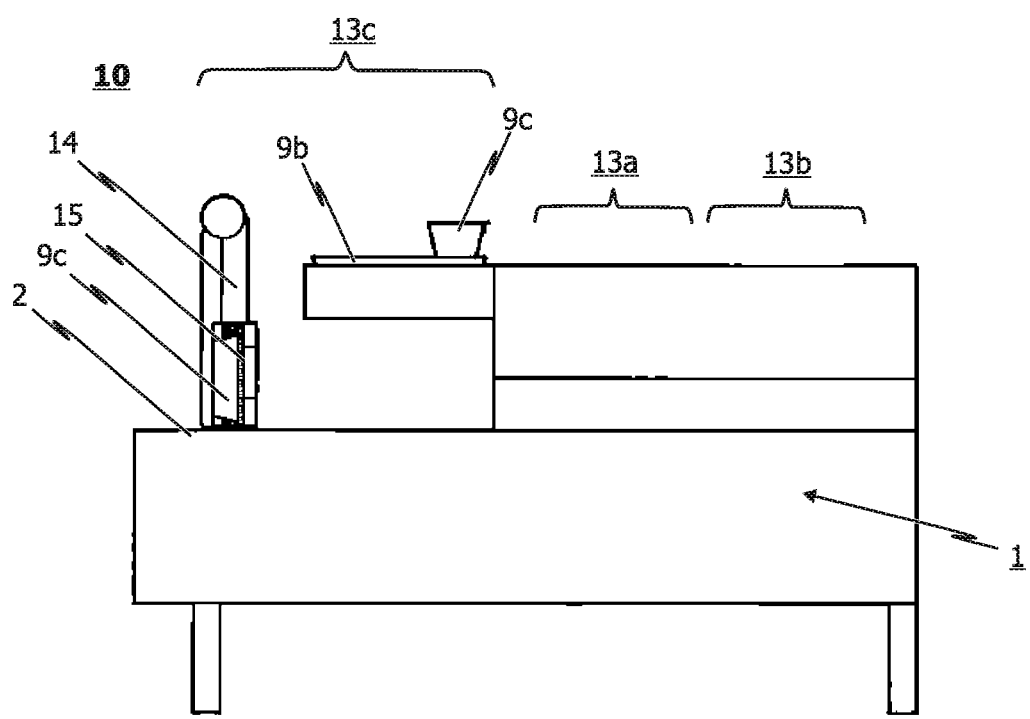
FIG. 2B shows schematically, and in a side view, the loading system according to FIG. 2A in a second state, in which the manipulator of the loading system is located in its loading position.

For example, FIG. 2B shows schematically, and in a side view, the loading system 10 according to FIG. 2A in a second state, in which the manipulator 14 of the loading system 10 is in its loading position.

It is expedient in principle if a positioning aid is associated in particular with the gripper system 15 of the at least one manipulator 14 of the third loading arrangement 13c, which positioning aid has at least one guide element, wherein the at least one guide element is designed to direct preferably only washware 9c of the third washware group, which is fed by means of the feed conveyor belt 11, in the direction of the gripping region of the at least one set of gripping tongs of the gripper system 15.

According to developments, provision is made that a preferably optically operating identification system 16 is associated with the gripper system 15 for the purpose of automatically identifying washware 9a, 9b, 9c which is fed by means of the feed conveyor belt 11, in particular washware 9c of the third washware group. In this connection, reference is made to the illustrations in FIG. 3A and FIG. 3B.

Figure 3A:
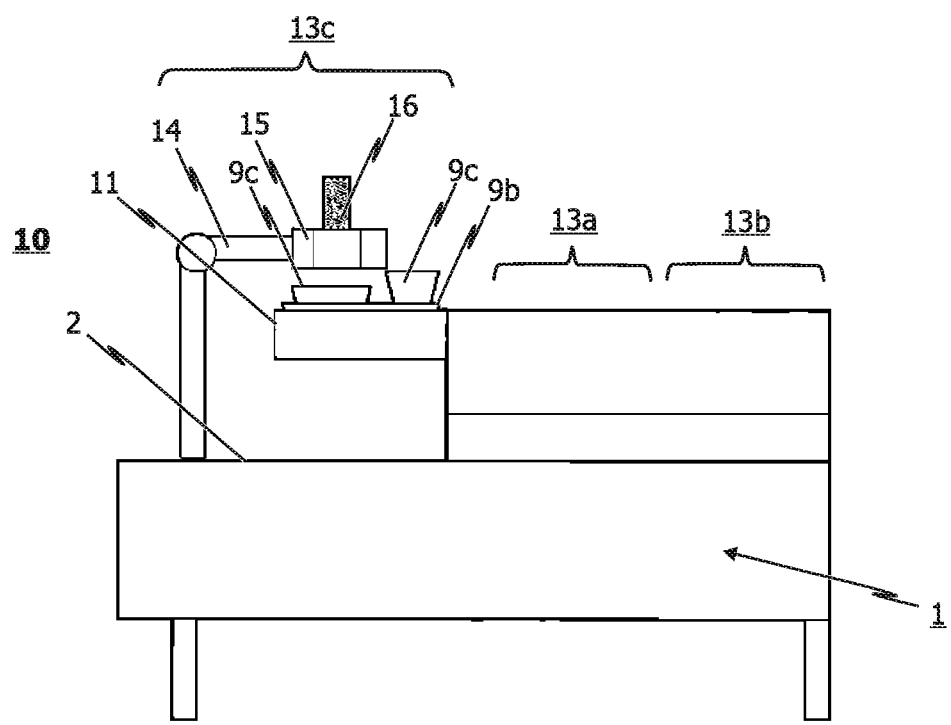
FIG. 3A shows schematically, and in a side view, an illustrative embodiment of the loading system according to the invention in a first state, in which a manipulator of the loading system is located in its starting position or identification position.
Figure 3B:
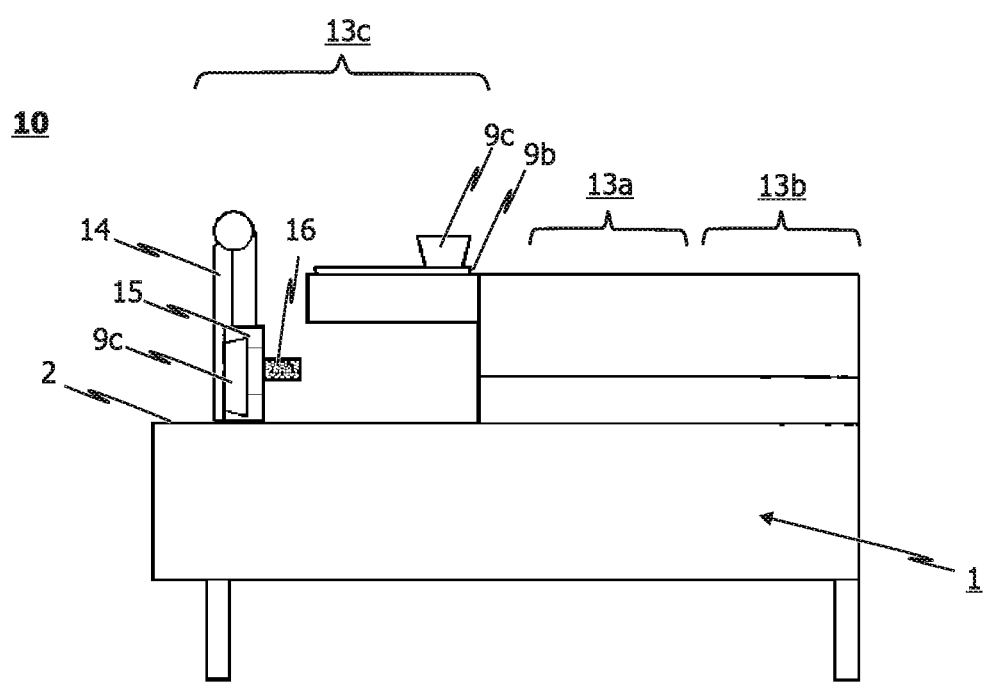
FIG. 3B shows schematically, and in a side view, the loading system according to FIG. 3A in a second state, in which the manipulator of the loading system is in its loading position.

Specifically FIG. 3A shows schematically, and in a side view, an illustrative embodiment of the loading system 10 according to the invention in a first state, in which a manipulator 14 of the loading system 10 is in its starting position or identifying position. By contrast, FIG. 3B shows schematically, and in a side view, the loading system 10 according to FIG. 3A in a second state, in which the manipulator 14 of the loading system 10 is in its loading position.

In this embodiment, the control device associated with the loading system 10 should be designed to move the manipulator 14 of the third loading arrangement 13c with the gripper system 15 to the item of washware 9 when the identification system 16 identifies in particular an item of washware 9c of the third washware group in the washware 9a, 9c, 9c which is fed by means of the feed conveyor belt 11.

In the solutions shown schematically in FIG. 2A and FIG. 3A, the starting position of the manipulator 14 is in each case arranged above the feed conveyor belt 11. The manipulator 14 is equipped with the gripper system 15.

In the solution shown in FIG. 2A, the gripper system 15 itself is equipped with a sensor which detects the presence of washware 9a, 9b, 9c, in particular washware 9c of the third washware group, in the gripping region of the at least one gripper of the gripper system 15.

As soon as washware 9a, 9b, 9c is conveyed by the feed conveyor belt 11 into the gripping region of the at least one gripper of the gripper system 15, this is detected by the sensor, and the gripper closes automatically. In this way, the washware 9a, 9b, 9c is stopped in the gripper system 15.

In the next step, the manipulator 14 removes the item of washware 9c from the tray 9b. The item of washware 9c is then ideally sorted into the main conveyor belt 2 of the conveyor dishwasher 1. For this purpose, the manipulator 14 executes a pivoting movement, for example, and places the item of washware 9c parallel to the transport compartments into which the main conveyor belt 2 is divided. When a transport compartment is located underneath the item of washware 9c, the gripper of the gripper system 15 opens and thus loads the item of washware 9c into the main conveyor belt 2 (cf. FIG. 2B).

As has already been stated, the manipulator 14 can alternatively set down the item of washware 9c in a dedicated set-down area and thus form a stack of crockery. This can then be sorted into the main conveyor belt 2 by the operating personnel.

Depending on the manipulator 14 used and on the gripper system 15, an additional positioning aid can be integrated which aligns the washware 9c on the tray. In this way, the manipulator 14 can grip the washware 9c more efficiently and remove it from the tray 9b.

As in the first solution, shown schematically in FIGS. 2A and 2B, the starting position of the manipulator 14 in the second solution, shown in FIGS. 3A and 3B, is above the feed conveyor belt 11. However, in contrast to the gripper system 15 according to FIG. 2A, the gripper system 15 according to FIG. 3A is assigned a preferably optically operating identification system 16 for automatically identifying washware 9a, 9b, 9c delivered by the feed conveyor belt 11, in particular washware 9c of the third washware group.

For example, the optically operating identification system 16 can be configured as a camera system with which the gripper system 15 of the manipulator 14 is equipped. With the aid of this optically operating identification system 16 or camera system, it is possible to identify the items of washware 9c and their position on the trays 9b, which are conveyed continuously by the feed conveyor belt 11 to the inlet region of the conveyor dishwasher 1.

Moreover, a control device is provided which is designed to move the manipulator 14 of the third loading arrangement 13c with the gripper system 15 to the item of washware 9c when the identification system 16 identifies an item of washware 9c of the third washware group in the washware 9a, 9c, 9c which is fed by means of the feed conveyor belt 11.

For this purpose, the manipulator arm is located in its standby or identification position above the feed conveyor belt 11 (cf. FIG. 3A). When a place setting is transported past the optically operating identification system 16 with the aid of the feed conveyor belt 11, the positions of the individual items of crockery 9c are first of all identified. The manipulator 14 then positions itself automatically at a corresponding item of crockery 9c. With the aid of the optically operating identification system 16, it is ensured that the item of crockery 9c is correctly received by the gripper system 15 and stopped.

In a next step, the manipulator 14 removes the item of washware 9c from the tray 9b. The item of washware 9c is then ideally sorted into the main conveyor belt 2 of the conveyor dishwasher 1. For this purpose, the manipulator 14 executes a pivoting movement and places the item of washware 9c parallel to the transport compartments into which the main conveyor belt 2 is divided. When a transport compartment is located underneath the item of crockery, the gripper system 15 opens and thus loads the item of crockery 9c into the main conveyor belt (cf. FIG. 3B).

In this solution too, an alternative is for the item of washware 9c to be placed with the aid of the manipulator 14 onto a dedicated set-down area in order thereby to form a stack of crockery. The latter can then be sorted into the main conveyor belt by the operating personnel.

Depending on the manipulator 14 used and on the gripper system 15, an additional positioning aid can also be integrated here, which aligns the washware 9c on the tray 9b. In this way, the manipulator 14 can grip the washware 9c more efficiently and remove it from the tray 9b.

The combination of gripper system 15 and optically operating identification system 16/camera system affords the advantage that the washware 9c is identified by the optically operating identification system 16/camera system in each case before being gripped.

In this way, additional work steps can be performed by the operating personnel, for example removing leftovers from the place settings, removing glasses from the trays, loading additional washware, for example washware of the fourth or fifth washware group, from the tray directly into the conveyor dishwasher 1, and picking out items of cutlery 9a from among other washware.

If, during manual work steps, items of washware 9c are shifted on the tray 9b, this has no effect on the functioning of the manipulator 14, since the optically operating identification system 16 detects the items of washware 9c just before they are removed from the tray 9b.

By comparison, in the case of an optically operating identification system 16 arranged upstream, no manual work steps are permissible between the identification system 16 and the manipulator 14. The identification system 16 in this case detects the items of washware 9c of the place setting which is conveyed on the feed conveyor belt 11 to the conveyor dishwasher 1.

In the next step, the items of crockery 9c are removed from the manipulator 14. Manual work steps between the identification system 16 and the manipulator 14 can cause the items of washware 9c to shift, which has the effect that the manipulator 14 cannot remove the items of washware from the tray 9b.

FIG. 4 shows schematically, and in an isometric view, the loading region of a conveyor dishwasher 1 with an illustrative embodiment of the loading system 10 according to the invention, in which a corresponding loading arrangement 13b (second loading arrangement) is used to automatically load a tray lane 4 that runs parallel to a main conveyor belt of the conveyor dishwasher 1.

FIG. 5A and FIG. 5B show schematically, and in a plan view (FIG. 5A) and a cross-sectional view (FIG. 5B), the main conveyor belt 2 and, running parallel thereto, the tray lane 4 of the conveyor dishwasher 1 according to FIG. 4.

FIG. 6 shows schematically, and in an isometric view, the loading region of a conveyor dishwasher 1, specifically together with a first and second loading arrangement 13a, 13b, which are assigned to the sorting arrangement of the loading system 10 according to the invention. Here, the first loading arrangement 13a serves to automatically load the conveyor dishwasher 1 with washware 9a of the first washware group, i.e. with cutlery and/or items of cutlery which is/are produced from a metal, in particular stainless steel.

FIG. 7A and FIG. 7B show schematically, and in a plan view (FIG. 7A) and a cross-sectional view (FIG. 7B), the main conveyor belt 2 and, running parallel thereto, the tray and cutlery lanes 4, 3 of the conveyor dishwasher 1 according to FIG. 6.

Seen in the conveying direction of the feed conveyor belt 11, the first loading arrangement 13a is arranged upstream from the second loading arrangement 13b. The second loading arrangement 13b serves to automatically load washware 9b of the second washware group into the conveyor dishwasher 1.

As can be seen from the illustrations in FIG. 7A and FIG. 7B, the conveyor apparatus of the conveyor dishwasher 1 in this embodiment has a first conveyor belt 4 for trays or tray-like washware 9b (=tray lane) and, running parallel to the first conveyor belt 4, a second conveyor belt 3 for cutlery or cutlery-like items (=cutlery lane), and also, running parallel to the latter, a third conveyor belt 2 (=main conveyor belt) for washware 9c of the third washware group.

The first conveyor belt 4 is relatively narrow compared to the third conveyor belt 2, such that a tray or tray-like washware 9b can be removed from the first conveyor belt 4 only in a state in which it is placed on end and is oriented parallel to the conveying direction. The orientation of the washware 9b, which is to be removed from the first conveyor belt 4, parallel to the direction in which the first conveyor belt 4 runs results in minimal utilization of the surface area of the total belt surface area.

In other words, the first conveyor belt 4 has a width which is reduced in such a way that only a minimal surface area of the total belt surface area is occupied by the first conveyor belt 4, this specifically permitting trays or tray-like washware 9b to be placed in position when this washware 9b is in a state in which it is placed on end and is oriented parallel to the conveying direction.

The second conveyor belt 3, designed as cutlery conveyor belt, likewise has a reduced width compared to the third conveyor belt 2.

This means that it is possible for the third conveyor belt 2, as before, to have a sufficient width in order to continue to be able to be used almost without restriction for conveying washware 9c of the third washware group, in particular plates, bowls and/or glasses, through the individual treatment zones of the conveyor dishwashers. Therefore, for example, racks of glasses or GN containers can, as before, also be placed on the third conveyor belt 2 next to the tray or tray-like washware 9b which is received on the first conveyor belt.

FIG. 4 and FIG. 6 each show only a part of the sorting arrangement, specifically that region of the sorting arrangement which, seen in the conveying direction of the feed conveyor, is arranged behind the third loading arrangement 13a, 13b, 13c.

From there, the place settings from which the washware 9c of the third washware group has already been removed automatically with the aid of the third loading arrangement 13c (not shown in FIG. 4 and FIG. 6), are delivered via the feed conveyor belt 13 to the first loading arrangement 13a according to FIG. 4 and FIG. 6. In the first loading arrangement 13a, the cutlery 9a is removed from the trays 9b with the aid of a cutlery pick-up magnet in the form of an actuable magnet 17, and the items of cutlery 9a are then introduced automatically into the cutlery lane 3 of the conveyor dishwasher 1.

The tray 9b is then fed to the synchronizing device of the second loading arrangement 13b, where it is automatically placed into the corresponding tray lane 4 of the conveyor dishwasher 1 (cf. FIG. 6).

FIG. 6 shows an embodiment of a synchronizing device of the second loading arrangement 13b. In brief, the synchronizing device has a corresponding guide 18 via which the trays 9b are automatically transferred from their horizontal state to a state in which they stand on end, and they are then introduced into the corresponding tray lane 4 of the conveyor dishwasher 1.

The invention is not limited to the embodiments shown in the drawings and is instead the result of joint consideration of all of the features disclosed herein.

The invention claimed is:

1. A system for loading a commercial conveyor dishwasher, wherein the system has the following:
 a feed conveyor belt for feeding washware to a loading region of the conveyor dishwasher; and
 a sorting arrangement for sorting the washware, which is fed to the loading region of the conveyor dishwasher by the feed conveyor belt, in accordance with predefined or predefinable washware groups,
 wherein at least one loading arrangement is associated with the sorting arrangement for the purpose of automatically loading the conveyor dishwasher with washware of one of the predefined or predefinable washware groups;
 wherein the sorting arrangement is designed to sort the washware, which is fed by the feed conveyor belt, in accordance with at least the following washware groups:
  a first washware group which comprises cutlery and/or items of cutlery which is/are produced from a metal;
  a second washware group which comprises trays and tray-like objects which are produced from a plastic material; and
  a third washware group which comprises items of crockery produced from porcelain or a porcelain-like material;
 wherein the at least one loading arrangement includes a third loading arrangement associated with the sorting arrangement for the purpose of automatically loading the conveyor dishwasher with washware of the third washware group;
 wherein the third loading arrangement has at least one manipulator which is designed to grip items of washware of the third washware group, to remove said items of washware of the third washware group from the feed conveyor belt and to set down said items of washware of the third washware group in a predefined or predefinable dedicated position;
 wherein the at least one manipulator of the third loading arrangement has a gripper system having at least one set of gripping tongs and/or having at least one suction gripper, for gripping said items of washware of the third washware group;
 wherein the at least one manipulator of the third loading arrangement has a starting position in which the gripper system of the manipulator is arranged above the feed conveyor belt, as seen in a vertical direction, such that items of washware of the third washware group, when conveyed by the feed conveyor belt, are conveyed into the gripping region of the at least one set of gripping tongs and/or into the gripping region of the at least one suction gripper, wherein the starting position of the at least one manipulator of the third loading arrangement is selected in such a way that, when conveyed by the feed conveyor belt, only items of washware of the third washware group, but not items of washware of the first washware group or the second washware group, are conveyed into the gripping region of the at least one set of gripping tongs and/or of the at least one suction gripper.

2. The system according to claim 1,
 wherein the sorting arrangement is designed to sort washware, which are fed by the feed conveyor belt, in accordance with the washware groups depending on the material, size and/or shape of the washware.

3. The system according to claim 1,
 wherein the sorting arrangement has multiple sorting stations, which are arranged one behind the other, as seen in the conveying direction of the feed conveyor belt, for successively sorting the washware which is fed by the feed conveyor belt.

4. The system according to claim 1,
 wherein the at least one loading arrangement further comprises:
  a first loading arrangement is associated with the sorting arrangement for the purpose of automatically loading the conveyor dishwasher with washware of the first washware group; and
  a second loading arrangement associated with the sorting arrangement for the purpose of automatically loading the conveyor dishwasher with washware of the second washware group.

5. The system according to claim 4,
 wherein the third loading arrangement is arranged upstream, as seen in the conveying direction of the feed conveyor belt, of the first and second loading arrangement, and wherein the first loading arrangement is arranged upstream of the second loading arrangement.

6. The system according to claim 4,
 wherein the first and the second loading arrangement are realized in a common region at the end of the feed conveyor belt, wherein a guide is provided in the common region, by means of which guide trays which are fed by the feed conveyor belt are changed over from a horizontal state to an upright state and are automatically placed into a tray conveyor belt of the conveyor dishwasher; and/or
 wherein the first, second and third loading arrangements are designed to place washware of the washware groups which are respectively associated with the first, second and third loading arrangements into dedicated regions of a conveyor belt of the conveyor dishwasher and/or into dedicated conveyor belts of the conveyor dishwasher.

7. The system according to claim 1,
wherein the predefined or predefinable dedicated position lies in a region of a conveyor belt of the conveyor dishwasher; or
wherein the predefined or predefinable dedicated position lies in a region which is located outside the conveyor dishwasher and serves as a set-down area for forming a stack of crockery.

8. The system according to claim 1,
wherein the at least one manipulator of the third loading arrangement has an actuable magnet for removing washware of the first washware group as desired from washware which is fed by the feed conveyor belt.

9. The system according to claim 1,
wherein a sensor system is associated with the gripper system of the at least one manipulator of the third loading arrangement, which sensor system is designed to detect when at least one item of washware of the third washware group is located in the gripping region of the at least one set of gripping tongs and/or in the gripping region of the at least one suction gripper, wherein a control device is also provided, which control device is designed to initiate gripping by the at least one set of gripping tongs and/or the at least one suction gripper when the sensor system, which is associated with the gripper system, detects that at least one item of washware of the third washware group is located in the gripping region of the at least one set of gripping tongs and/or in the gripping region of the at least one suction gripper, wherein the control device is also designed to actuate the at least one manipulator of the third loading arrangement in such a way that the said manipulator removes the at least one item of washware, which is gripped by the gripper system, from the feed conveyor belt and sets down the said item of washware in a predefined or predefinable dedicated position; and/or
wherein a positioning aid is associated with the gripper system of the at least one manipulator of the third loading arrangement, which positioning aid has at least one guide element, wherein the at least one guide element is designed to direct only washware of the third washware group, which is fed by the feed conveyor belt, in the direction of the gripping region of the at least one set of gripping tongs and/or of the at least one suction gripper.

10. The system according to claim 1,
wherein a optically operating identification system is associated with the gripper system for the purpose of automatically identifying washware of the third washware group, wherein a control device is also provided, which control device is designed to move the manipulator of the third loading arrangement with the gripper system to the item of washware of the third washware group when the identification system identifies the item of washware of the third washware group in the washware which is fed by the feed conveyor belt.

11. The system according to claim 1,
wherein the sorting arrangement is designed to also sort the washware, which is fed by the feed conveyor belt, in accordance with at least one of the following washware groups:
   a fourth washware group which comprises drinking glasses and/or bowls which are produced from glass or from a glass-like material; and
   a fifth washware group which comprises GN containers, pots and/or pans, which are produced from a metal.

12. A conveyor dishwasher comprising at least one conveying apparatus, in the form of at least one conveyor belt, wherein the conveyor dishwasher, in its inlet region, is provided with at least one system according to claim 1 for automatically placing washware into the conveying apparatus.

* * * * *